United States Patent
Duge et al.

(10) Patent No.: US 10,563,579 B2
(45) Date of Patent: Feb. 18, 2020

(54) AIR-INLET DUCT HAVING A PARTICLE SEPARATOR AND AN AGGLOMERATOR FOR A GAS TURBINE ENGINE

(71) Applicant: Rolls-Royce North American Technologies, Inc., Indianapolis, IN (US)

(72) Inventors: Robert T. Duge, Carmel, IN (US); Crawford F. Smith, III, Carmel, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 660 days.

(21) Appl. No.: 15/292,676

(22) Filed: Oct. 13, 2016

(65) Prior Publication Data
US 2017/0138263 A1    May 18, 2017

Related U.S. Application Data

(60) Provisional application No. 62/256,965, filed on Nov. 18, 2015.

(51) Int. Cl.
| | |
|---|---|
| *F02C 7/052* | (2006.01) |
| *F02C 7/047* | (2006.01) |
| *B64D 33/02* | (2006.01) |
| *B01D 45/04* | (2006.01) |
| *B03C 3/017* | (2006.01) |

(Continued)

(52) U.S. Cl.
CPC .............. *F02C 7/052* (2013.01); *B01D 45/04* (2013.01); *B03C 3/0175* (2013.01); *B03C 3/145* (2013.01); *B64D 33/02* (2013.01); *F02C 3/04* (2013.01); *F02C 7/047* (2013.01); *B64D 2033/0246* (2013.01); *F05D 2220/32* (2013.01);
(Continued)

(58) Field of Classification Search
CPC .. F02C 7/052; F02C 7/047; F02C 7/04; B03C 3/0175; B64D 33/02; B64D 2033/0246
See application file for complete search history.

(56) References Cited

U.S. PATENT DOCUMENTS

| | | | |
|---|---|---|---|
| 3,755,122 A | 8/1973 | Melcher et al. | |
| 4,389,227 A * | 6/1983 | Hobbs | F02C 7/052 244/53 B |

(Continued)

FOREIGN PATENT DOCUMENTS

| | | |
|---|---|---|
| EP | 2927504 | 10/2015 |
| EP | 3067532 | 9/2016 |

OTHER PUBLICATIONS

Extended European Search Report, European Application No. 16196187.5-1607 dated Mar. 29, 2017, 7 pages.
(Continued)

*Primary Examiner* — Carlos A Rivera
(74) *Attorney, Agent, or Firm* — Barnes & Thornburg LLP

(57) ABSTRACT

An air-inlet duct includes a particle separator and an agglomerator. The particle separator is configured to receive atmospheric air laden with particles and to direct the particles into a scavenge passageway while allowing the atmospheric air to move into a compressor passageway thereby reducing the number of particles that enter the compressor passageway. The agglomerator is configured to cause the particles to be attracted to one another and cluster together.

12 Claims, 5 Drawing Sheets

(51) Int. Cl.
*B03C 3/145* (2006.01)
*F02C 3/04* (2006.01)

(52) U.S. Cl.
CPC .... *F05D 2240/35* (2013.01); *F05D 2300/507* (2013.01); *Y02T 50/672* (2013.01)

(56) References Cited

U.S. PATENT DOCUMENTS

| | | | |
|---|---|---|---|
| 4,876,852 A * | 10/1989 | Abthoff | B03C 3/0175 60/275 |
| 5,683,494 A | 11/1997 | Altman et al. | |
| 5,695,549 A | 12/1997 | Feldman et al. | |
| 5,972,215 A | 10/1999 | Kammel | |
| 6,250,068 B1 * | 6/2001 | Tajima | F01D 25/02 60/803 |
| 6,355,178 B1 | 3/2002 | Couture et al. | |
| 6,589,314 B1 | 7/2003 | Page et al. | |
| 6,698,180 B2 * | 3/2004 | Snyder | B01D 45/08 137/15.1 |
| 6,932,857 B1 | 8/2005 | Krigmont | |
| 7,608,122 B2 * | 10/2009 | Snyder | F02C 7/052 55/306 |
| 7,964,021 B2 | 6/2011 | Younsi et al. | |
| 8,372,183 B2 | 2/2013 | Doucette et al. | |
| 8,894,745 B2 | 11/2014 | Dunn | |
| 9,073,062 B2 | 7/2015 | Dunn | |
| 2003/0110943 A1 * | 6/2003 | Page | B03C 3/011 95/62 |
| 2006/0223429 A1 * | 10/2006 | Groom | B64D 33/02 454/155 |
| 2012/0067214 A1 | 3/2012 | Salcedo | |
| 2015/0090120 A1 | 4/2015 | Au et al. | |
| 2015/0198090 A1 * | 7/2015 | Howe | F02C 7/052 60/39.092 |
| 2016/0265435 A1 * | 9/2016 | Snyder | F02C 7/057 |

OTHER PUBLICATIONS

Stocker, John, "Corona Vortex Agglomerator", Science/Evolved, pp. 1-2, publication date unknown, reference known to Applicant as of Feb. 24, 2015.

* cited by examiner

AIR-INLET DUCT HAVING A PARTICLE SEPARATOR AND AN AGGLOMERATOR FOR A GAS TURBINE ENGINE

CROSS REFERENCE TO RELATED APPLICATIONS

This application claims priority to and the benefit of U.S. Provisional Patent Application No. 62/256,965, filed 18 Nov. 2015, the disclosure of which is now expressly incorporated herein by reference.

FIELD OF THE DISCLOSURE

The present disclosure relates generally to gas turbine engines, and more specifically to air-inlet ducts included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the resulting fuel-air mixture is ignited. Products of the combustion reaction in the combustor are directed into the turbine where work is extracted to drive the compressor and, sometimes, an output shaft. Left-over products of the combustion reaction are exhausted out of the turbine and may provide thrust in some applications.

Air is drawn into the engine through an air inlet and communicated to the compressor via an air-inlet duct. In some operating conditions, particles such as dust, sand, or liquid water may be entrained in the air and may be drawn into the air inlet and passed through the air-inlet duct to the compressor. Such particles may impact components of the compressor and turbine causing unintended wear. This unintended wear may decrease power output of the engine, shorten the life span of the engine, and lead to increased maintenance costs and increased down time of the engine.

SUMMARY

The present disclosure may comprise one or more of the following features and combinations thereof.

An air-inlet duct for a gas turbine engine may include a particle separator and an agglomerator. The particle separator may be formed to include an inlet passageway for receiving a stream of air, a compressor passageway that extends downstream from the inlet passageway, and a scavenge passageway that extends downstream from the inlet passageway and that is positioned radially outward of the compressor passageway. The particle separator may be configured to receive atmospheric air laden with fine particles and large particles. The particle separator may be configured to direct the large particles into the scavenge passageway while allowing the atmospheric air to move into the compressor passageway thereby reducing the number of large particles that enter the compressor passageway. The agglomerator may be configured to emit an electro-magnetic field into the inlet passageway to charge the fine particles in the inlet passageway to cause the fine particles to be attracted to one another and cluster together to form large particles directed into the scavenge passageway by the particle separator to reduce the number of fine particles directed into the compressor passageway.

In some embodiments, the particle separator may include an outer wall, an inner wall, and a splitter. The outer wall may be spaced apart from an engine rotation axis. The inner wall may be located between the outer wall and the engine rotation axis. The inner wall and the outer wall may define the inlet passageway therebetween. The splitter may be located between the outer wall and the inner wall. The splitter may include an outer splitter surface that cooperates with the outer wall to define the scavenge passageway therebetween and an inner splitter surface cooperating with the inner wall to define the compressor passageway therebetween.

In some embodiments, the inner wall, the outer wall, and the splitter may include electromagnetically conductive material. The agglomerator may include an electrical charge source configured to electrically charge at least one of the inner wall, the outer wall, and the splitter to emit the electro-magnetic field into the inlet passageway. In some embodiments, the electrical charge source may be configured to charge at least one of the inner wall, the outer wall, and the splitter with an alternating current.

In some embodiments, the agglomerator may include a spiral-shaped conductive element and an electrical charge source. The spiral-shaped conductive element may be coupled to the outer splitter surface and may be arranged around the engine rotation axis. The electrical charge source may be configured to electrically charge the spiral-shaped conductive element.

In some embodiments, the outer splitter surface may be coupled to the inner splitter surface at a splitter tip of the splitter. The splitter tip may include an electro-magnetically transparent window. The agglomerator may include an antenna located in the splitter tip. The antenna may be configured to emit the electro-magnetic field through the electro-magnetically transparent window.

In some embodiments, the agglomerator may comprise an antenna configured to emit the electro-magnetic field. In some embodiments, the antenna may be one of a yagi antenna, a slotted waveguide antenna, a log spiral antenna, and a dish shaped antenna.

According to another aspect of the present disclosure, a gas turbine engine may include an engine core and an air-inlet duct. The engine core may include a compressor configured to compress air, a combustor configured to mix fuel with compressed air from the compressor to form a fuel-air mixture and to ignite the fuel-air mixture, and a turbine configured to extract work from combusted products of the fuel-air mixture. The air-inlet duct may include a particle separator and an agglomerator.

The particle separator may be formed to include an inlet passageway for receiving a stream of air, a compressor passageway that extends downstream from the inlet passageway, and a scavenge passageway that extends downstream from the inlet passageway and that is positioned radially outward of the compressor passageway. The particle separator may be configured to receive atmospheric air laden with fine particles and large particles and to direct the large particles into the scavenge passageway while allowing the atmospheric air to move into the compressor passageway thereby reducing the number of large particles that enter the compressor. The agglomerator may be configured to emit an electro-magnetic field into the inlet passageway to charge the fine particles in the inlet passageway to cause the fine particles to be attracted to one another and cluster together to form large particles directed into the scavenge passageway by the particle separator to reduce the number of fine particles directed into the compressor.

In some embodiments, the particle separator may include an outer wall spaced apart from an engine rotation axis, an inner wall located between the outer wall and the engine rotation axis, and a splitter located between the outer wall and the inner wall. The inner wall and the outer wall may define the inlet passageway therebetween. The splitter may include an outer splitter surface that cooperates with the outer wall to define the scavenge passageway therebetween and an inner splitter surface cooperating with the inner wall to define the compressor passageway therebetween.

In some embodiments, the outer splitter surface may be coupled to the inner splitter surface at a splitter tip of the splitter. The splitter tip may include an electro-magnetically transparent window. The agglomerator may include an antenna located in the splitter tip that is configured to emit the electro-magnetic field through the electro-magnetically transparent window. The electro-magnetically transparent window may comprise ceramic.

In some embodiments, the outer splitter surface may be coupled to the inner splitter surface at a splitter tip of the splitter. The splitter tip may include an electro-magnetically transparent window. The agglomerator may include an antenna located in the splitter tip that is configured to emit the electro-magnetic field through the electro-magnetically transparent window. The electro-magnetically transparent window may comprise fiberglass.

In some embodiments, the particle separator may include an outer wall spaced apart from an engine rotation axis and an inner wall located between the outer wall and the engine rotation axis. The inner wall and the outer wall may define the inlet passageway therebetween. The inner wall and the outer wall may include electromagnetically conductive material. The agglomerator may include an electrical charge source configured to electrically charge the inner wall and the outer wall to cause the inner wall and the outer wall to emit electro-magnetic fields into the inlet passageway.

In some embodiments, the agglomerator may include an antenna configured to emit the electro-magnetic field. In some embodiments, the antenna may be one of a yagi antenna, a slotted waveguide antenna, a log spiral antenna, and a dish shaped antenna.

In some embodiments, the gas turbine engine may further include a second particle separator located between the compressor passageway and the compressor. The second particle separator may be configured to direct any large particles in the second particle separator radially outward into a second scavenge passageway to reduce the number of large particles directed into the compressor.

According to another aspect of the present disclosure, a method of separating particles suspended in an air-inlet duct included in gas turbine engine may include a number of steps. The method may include charging fine particles suspended in an inlet passageway of the air-inlet duct to cause the fine particles to be attracted to one another and to cluster together to form large particles, collecting the large particles into a first portion of the air-inlet duct, separating air in the air-inlet duct into a first stream of air having an increased number of large particles suspended in the first stream of air and a second stream of air with a reduced number of large particles suspended in the second stream of air, and directing the first stream of air into a scavenge chamber included in the gas turbine engine and the second stream of air into a compressor included in the gas turbine engine.

In some embodiments, charging fine particles in the inlet passageway may include electrically charging electromagnetically conductive walls included in the air-inlet duct with an electrical charge source to emit an electro-magnetic field into the inlet passageway. In some embodiments, charging fine particles in the inlet passageway may include electrically charging an antenna with an electrical charge source to cause the antenna to emit an electro-magnetic field into the inlet passageway. In some embodiments, the antenna may be one of a yagi antenna, a slotted waveguide antenna, a log spiral antenna, and a dish shaped antenna.

According to another aspect of the present disclosure, an air-inlet duct may include a particle separator and an agglomerator. The particle separator may include an outer wall radially spaced apart from an engine rotation axis, an inner wall radially located between the outer wall and the engine rotation axis, and a splitter radially located between the outer wall and the inner wall. The inner wall and the outer wall may define an inlet passageway therebetween for receiving atmospheric air laden with fine particles and large particles. The splitter may include an outer splitter surface that cooperates with the outer wall to define a scavenge passageway therebetween and an inner splitter surface cooperating with the inner wall to define a compressor passageway therebetween. The scavenge passageway may extend downstream from the inlet passageway and may be positioned radially outward of the compressor passageway so that the large particles are directed into the scavenge passageway while the atmospheric air is directed into the compressor passageway thereby reducing the number of large particles that enter the compressor passageway.

The agglomerator may include an electrical charge source and a controller. The electrical charge source may be configured to charge at least one of the inner wall, the outer wall, and the splitter to cause the at least one of the inner wall, outer wall, and splitter to emit an electro-magnetic field into the inlet passageway to charge the fine particles in the inlet passageway to cause the fine particles to be attracted to one another and cluster together to form large particles directed into the scavenge passageway by the particle separator. The controller may be configured to adjust a magnitude of electric power supplied to the at least one of the inner wall, outer wall, and splitter from the electrical charge source to cause the at least one of the inner wall, outer wall, and splitter to generate heat and block ice accumulation in the air-inlet duct.

In some embodiments, the controller may be configured to adjust a voltage of the electric power supplied to the at least one of the inner wall, outer wall, and splitter from the electrical charge source. In some embodiments, the air-inlet duct may further include a sensor. The sensor may be configured to detect ice accumulation or potential ice accumulation in the air-inlet duct. The controller may be configured to adjust the magnitude of the electric power supplied to the at least one of the inner wall, outer wall, and splitter to melt the ice in response to receipt of signals from the sensor indicative of ice formation or potential ice formation.

In some embodiments, the air-inlet duct may further include a user input. The user input may be coupled to the controller and may be configured to receive inputs associated with icy conditions. The controller may be configured to adjust the magnitude of the electric power supplied to the at least one of the inner wall, outer wall, and splitter to melt the ice in response to receipt of signals from the user input.

In some embodiments, the at least one of the inner wall, outer wall, and splitter may include an electromagnetically transparent composite material that includes an electromagnetically conductive element configured to be charged by the electrical charge source. In some embodiments, the electromagnetically conductive element may include one or more of a conductive wire grid, conductive fibers, and conductive particles for radiating an electro-magnetic field.

These and other features of the present disclosure will become more apparent from the following description of the illustrative embodiments.

DETAILED DESCRIPTION OF THE DRAWINGS

Figure 1:
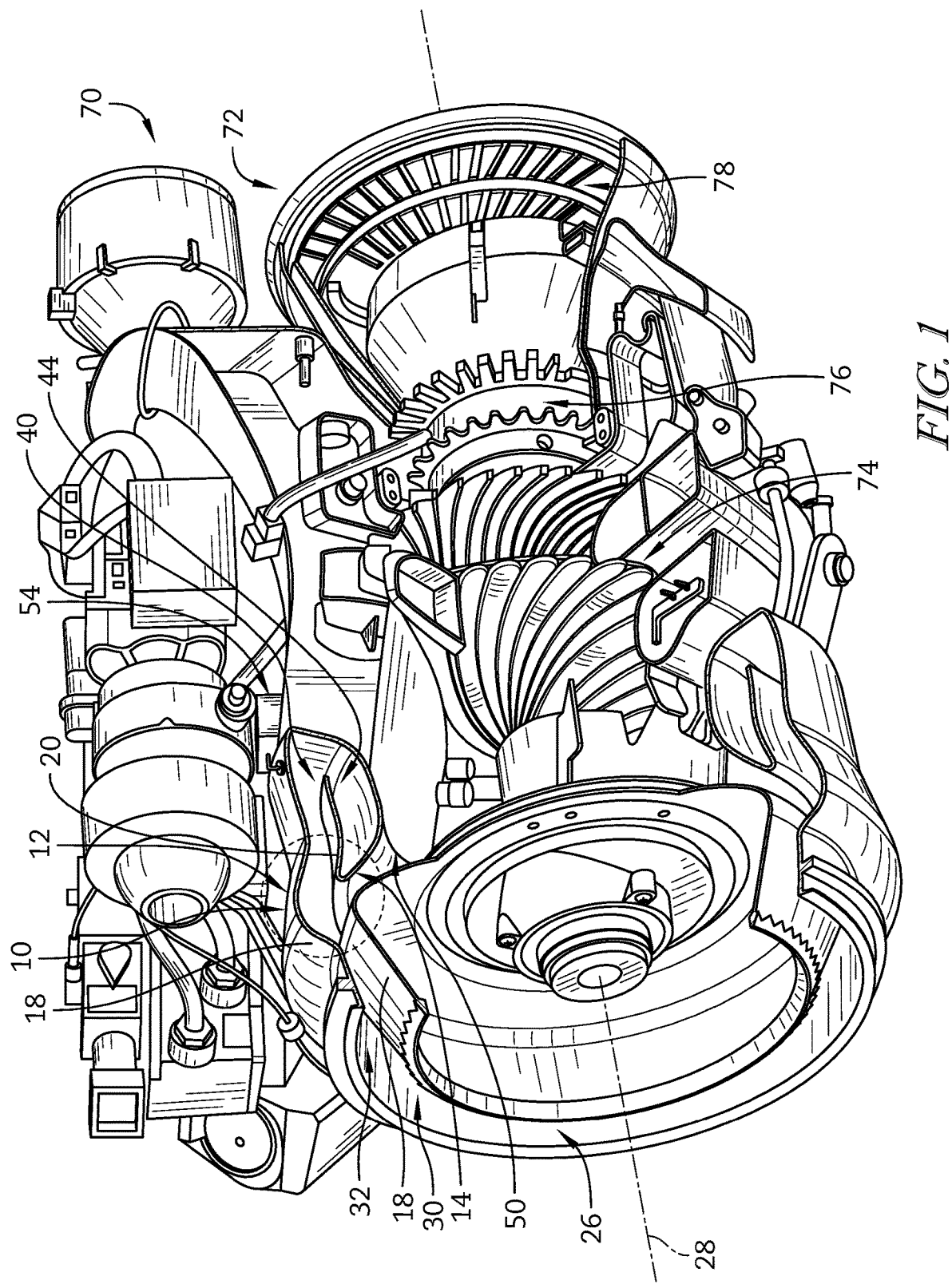
FIG. 1 is a cut-away perspective view of a gas turbine engine showing that the gas turbine engine includes an air-inlet duct adapted to conduct air entering the gas turbine engine into a compressor included in the gas turbine engine.

For the purposes of promoting an understanding of the principles of the disclosure, reference will now be made to a number of illustrative embodiments illustrated in the drawings and specific language will be used to describe the same.

A gas turbine engine 70 in accordance with the present disclosure is shown, for example, in FIG. 1. The gas turbine engine 70 includes an air-inlet duct 10 and an engine core 72. The engine core 72 is made up of a compressor 74, a combustor 76, and a turbine 78. Air is drawn into the gas turbine engine 70 through the air-inlet duct 10 prior to admission of the air into the compressor 74 as suggested in FIGS. 1 and 2. In some environments, particles such as dirt, sand, or liquid water may be entrained in the air and carried into the gas turbine engine 70. The air-inlet duct 10 is configured to separate the particles from the air to cause clean air, generally free from large particles, to be delivered to the compressor 74 so that damage to the compressor 74 and the turbine 78 can be reduced.

Figure 2:
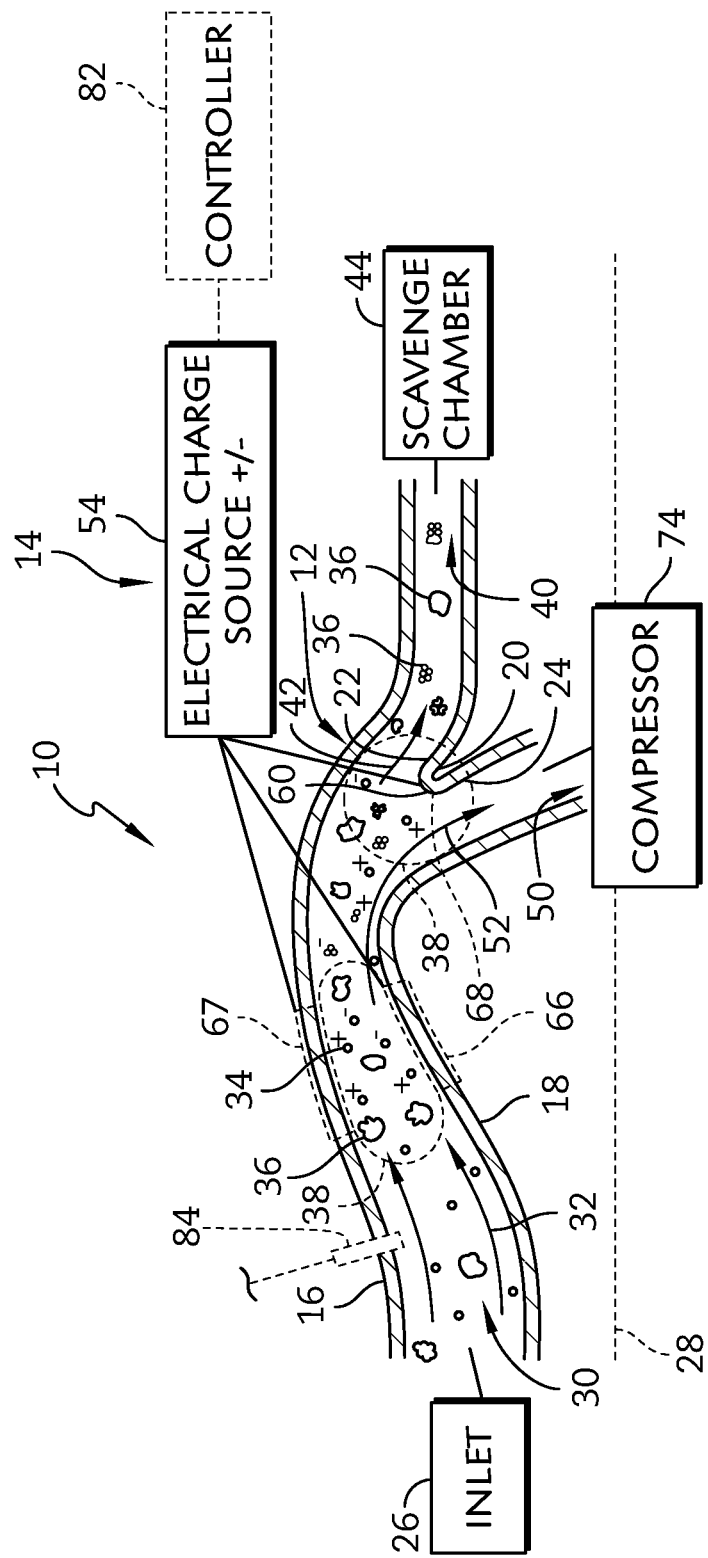
FIG. 2 is an enlarged partial view of the circled region of FIG. 1 showing a first embodiment of an air-inlet duct adapted for inclusion in the gas turbine engine, the air-inlet duct including a particle separator and an agglomerator configured to electrically charge portions of the particle separator so that particles entrained in the air entering the gas turbine engine clump together and can be collected by the particle separator.

The air-inlet duct 10 illustratively includes a particle separator 12 and an agglomerator 14 as shown in FIG. 2. The particle separator 12 is configured to receive atmospheric air laden with fine particles 34 and large particles 36 and to direct the large particles 36 into a scavenge passageway 40 while allowing the atmospheric air to move toward the compressor 74 thereby reducing the number of large particles 36 that enter the compressor 74. The agglomerator 14 is configured to emit an electro-magnetic field 38 in the particle separator 12 to charge the fine particles 34 to cause the fine particles 34 to be attracted to one another and cluster together to form additional large particles 36. The large particles 36 formed by the agglomerator 14 are directed into the scavenge passageway 40 by the particle separator 12. As a result, the number of fine particles 34 directed into the compressor 74 is reduced. In some embodiments, no fine or large particles 34, 36 are passed into the compressor 74.

The particle separator 12 is illustratively an inertial particle separator shaped so that large particles 36 entrained in the air are carried by their inertia into the scavenge passageway 40 while generally clean air is conducted into the compressor 74 as suggested in FIG. 2. The particle separator 12 of the illustrative embodiment includes an outer wall 16, an inner wall 18, and a splitter 20 as shown in FIG. 2. The outer wall 16 is located radially in spaced-apart relation to an engine rotation axis 28 as shown in FIG. 2. The inner wall 18 is located radially between the outer wall 16 and the engine rotation axis 28. The inner wall 18 and the outer wall 16 cooperate to define an inlet passageway 30 therebetween. The inlet passageway 30 is located at an inlet 26 of the gas turbine engine 70. The splitter 20 is located radially between the outer wall 16 and the inner wall 18 and cooperates with the outer wall 16 to establish the particle separator 12.

In the illustrative embodiment, the inner wall 18, the outer wall 16, and the splitter 20 include an electromagnetically conductive material. In other embodiments, at least one of the inner wall 18, the outer wall 16, and the splitter 20 includes an electromagnetically conductive material. In some embodiments, the electromagnetically conductive material comprises one or more of copper, silver, iron, gold, aluminum, tungsten, titanium, and any other suitable material. In the illustrative embodiment, the inner wall 18, the outer wall 16, and the splitter 20 include ferrous material.

In other embodiments, at least one of the inner wall 18, the outer wall 16, and the splitter 20 includes an electromagnetically transparent composite material that includes an electromagnetically conductive element. In some embodiments, the electromagnetically conductive element is one or more of a conductive wire grid, conductive fibers such as carbon, conductive particles, and any other suitable alternative of radiating an electro-magnetic field.

The splitter 20 includes an outer splitter surface 22 and an inner splitter surface 24 as shown in FIG. 2. The outer splitter surface 22 cooperates with the outer wall 16 to define the scavenge passageway 40 therebetween. The inner splitter surface 24 cooperates with the inner wall 18 to define a compressor passageway 50 therebetween. The outer splitter surface 22 is coupled to the inner splitter surface 24 at a splitter tip 60.

The scavenge passageway 40 is configured to receive and direct a dirty flow 42 including a mixture of air, some small particles 34, and large particles 36 into a scavenge chamber 44 as suggested in FIG. 2. An increased number of particles 34, 36 are suspended in the dirty flow 42 due to the particle separator 12 and agglomerator 14. In some embodiments, all particles 34, 36 are suspended in the dirty flow 42.

The compressor passageway 50 is configured to direct a clean flow 52 of air into the compressor 74 of the gas turbine engine 70. A reduced number of particles 34, 36 are suspended in the clean flow 52 due to the particle separator 12 and agglomerator 14. In some embodiments, no particles 34, 36 are suspended in the clean flow 52.

In the illustrative embodiment, the agglomerator 14 includes an electrical charge source 54 that cooperates with other components to create the electro-magnetic field 38 as shown in FIG. 2. The electrical charge source 54 is configured to electrically charge the inner wall 18, the outer wall 16, and the splitter 20 of the particle separator 12. Illustratively, the inner wall 18, the outer wall 16, and the splitter 20 include ferrous material and the charged inner wall 18, outer wall 16, and splitter 20 emit the electro-magnetic field 38 into the particle separator 12 to charge the fine particles 34.

As shown in FIG. 2, the charged outer wall 16, the charged inner wall 18, and the charged splitter 20 emit electro-magnetic fields 38 into the inlet passageway 30. In other embodiments, the electrical charge source 54 is configured to electrically charge at least one of the inner wall 18, the outer wall 16, and the splitter 20 of the particle separator 12.

In the illustrative embodiment, the electrical charge source 54 is configured to charge the inner wall 18, the outer wall 16, and the splitter 20 with an alternating current. In other embodiments, the electrical charge source 54 is configured to charge the inner wall 18, the outer wall 16, and the splitter 20 with a direct current. In some embodiments, the electrical charge source 54 is configured to charge each of the inner wall 18, the outer wall 16, and the splitter 20 with a direct current or an alternating current. As an example, the inner wall 18 may be charged with a direct current and the outer wall 16 may be charged with an alternating current.

In some embodiments, the electrical charge source 54 is configured to switch between direct current and alternating current for each of the inner wall 18, the outer wall 16, and the splitter 20. When direct current is used, the electrical charge source 54 is configured to positively or negatively charge the inner wall 18, the outer wall 16, and the splitter 20.

In some embodiments, the charge source 54 may be configured to apply power in the form of a high energy pulsed output that is not continuous. Such a configuration may allow a higher particle charging potential (thus increasing agglomeration effectiveness) with a lower average power usage required from the engine.

Illustratively, the electrical charge source 54 is configured to charge areas 66, 67, 68 of the inner wall 18, the outer wall 16, and the splitter 20 respectively as suggested in FIG. 2. In other embodiments, the electrical charge source 54 is configured to charge a point on at least one of the inner wall 18, the outer wall 16, and the splitter 20. The areas and points charged by the electrical charge source 54 are electrically insulated from the other portions of the particle separator 12 and the gas turbine engine 70.

In use, the air-inlet duct 10 draws the inlet flow 32 into the gas turbine engine 70. The inlet flow 32 includes air and entrained particles 34, 36. The agglomerator 14 charges the outer wall 16, the inner wall 18, and the splitter 20. As a result, the outer wall 16, the inner wall 18, and the splitter 20 emit electro-magnetic fields 38 into the inlet passageway 30 to charge the fine particles 34 suspended in the inlet passageway 30 to cause the fine particles 34 to be attracted to one another. The charged fine particles 34 cluster together and form large particles 36. The particle separator 12 directs the large particles 36 into the scavenge passageway 40 while allowing the atmospheric air to move into the compressor passageway 50 toward the compressor 74 thereby reducing the number of fine particles 34 and large particles 36 that enter the compressor 74.

A method of separating particles suspended in the air-inlet duct 10 may include charging fine particles 34 suspended in the inlet passageway 30 of the air-inlet duct 10 to cause the fine particles 34 to be attracted to one another and to cluster together to form large particles 36. The method may further include collecting the large particles 36 into a first portion of the air-inlet duct 10 and separating air in the air-inlet duct 10 into a first stream of air having an increased number of large particles 36 suspended in the first stream of air and a second stream of air with a reduced number of large particles 36 suspended in the second stream of air.

The method may further include directing the first stream of air into the scavenge chamber 44 included in the gas turbine engine 70 and the second stream of air into the compressor 74 included in the gas turbine engine 70. In some embodiments, charging the fine particles 34 in the inlet passageway 30 includes electrically charging ferrous walls included in the air-inlet duct 10 with an electrical charge source 54 to emit the electro-magnetic field 38 into the inlet passageway 30.

In some embodiments, charging the fine particles 34 in the inlet passageway 30 includes electrically charging an antenna 162 with an electrical charge source 154 to cause the antenna 162 to emit an electro-magnetic field 138 into the inlet passageway 130 as suggested in FIG. 3. In the illustrative embodiment, the antenna 162 is a directional antenna. In some embodiments, the antenna 162 is one of a yagi antenna, a slotted waveguide antenna, a log spiral antenna, a dish shaped antenna, and any other suitable alternative.

Some particle separators remove large diameter particles well, but small diameter particles may enter the engine and cause damage to the gas turbine engine 70. For example, the fine particles may wear compressor blades, block cooling holes, and adhere to turbine blades. Some particles separators cause a large pressure loss in the flow of air entering the compressor 74. Such pressure losses may reduce the efficiency of the gas turbine engine 70.

The particle separator 12 and agglomerator 14 enhance the capability to capture particles in the scavenge passageway 40 before the atmospheric air enters the flow leading to the compressor 74. The air-inlet duct 10 illustratively charges the particles with opposite or alternating charge that cause the fine particles 34 to adhere to each other to form large particles 36 that are captured in the scavenge passageway 40. As such, the air-inlet duct 10 reduces or eliminates the number of particles entering the compressor passageway 50 which may improve engine life. The air-inlet duct 10 causes low or no pressure loss in the flow of air directed to the compressor 74.

In some embodiments, the large particles 36 are greater than about 20 microns in diameter. In some embodiments, the large particles 36 are greater than about 80 microns in diameter. In some embodiments, the large particles 36 are greater than about 100 microns in diameter.

In some embodiments, the small diameter particles include fine particles 34. In some embodiments, the fine particles 34 are smaller than about 20 microns in diameter. In some embodiments, the fine particles 34 are smaller than about 10 microns in diameter. In some embodiments, the fine particles 34 are between about 0 and about 10 microns in diameter.

In some operating environments, ice may form on components of the gas turbine engine 70 such as, for example, on portions of the air-inlet duct 10. As an example, in cold environments, water vapor in the atmospheric air may condense and form ice on the inner wall 18, the outer wall 16, and/or the splitter 20.

Illustratively, the inner wall 18, the outer wall 16, and the splitter 20 include electromagnetically conductive material and/or an electromagnetically conductive element at areas 66, 67, 68. The areas 66, 67, 68 are configured to be charged by the electrical charge source 54 to emit the electromagnetic fields 38. Heat may be generated in the areas 66, 67, 68 when the areas 66, 67, 68 are charged. The heat generated in the areas 66, 67, 68 may be used to prevent ice accumulation in the air-inlet duct 10 and/or melts ice that has formed in the air-inlet duct 10.

In some embodiments, the air-inlet duct 10 further includes a controller 82 configured to adjust the power supplied to the electromagnetically conductive material and/or the electromagnetically conductive element from the electrical charge source 54 as shown in FIG. 2. The controller 82 is configured to control a magnitude of the power supplied to the areas 66, 67, 68 from the electrical charge source 54. As an example, the controller 82 is configured to adjust a voltage or amperage of electricity supplied to the areas 66, 67, 68 from the electrical charge source 54. As a result, air-inlet duct 10 provides an anti-icing system for gas turbine engine 70.

In some embodiments, the controller 82 is configured to temporarily adjust the magnitude of the power supplied to the areas 66, 67, 68 to reduce ice formation. In some embodiments, a sensor 84 is configured to detect ice accumulation, cold temperatures, moisture, and/or the like. The controller 82 is configured to adjust the power supplied to the areas 66, 67, 68 to melt or prevent ice in response to receipt of signals from the sensor 84 indicate of ice formation or potential ice formation. In some embodiments, a user input may be coupled to the controller 82 and may be configured to receive inputs associated with icy conditions. In such embodiments, the controller 82 may be configured to adjust the power supplied to the areas 66, 67, 68 to melt or prevent ice in response to receipt of signals from the user input associated with icy conditions.

Figure 3:
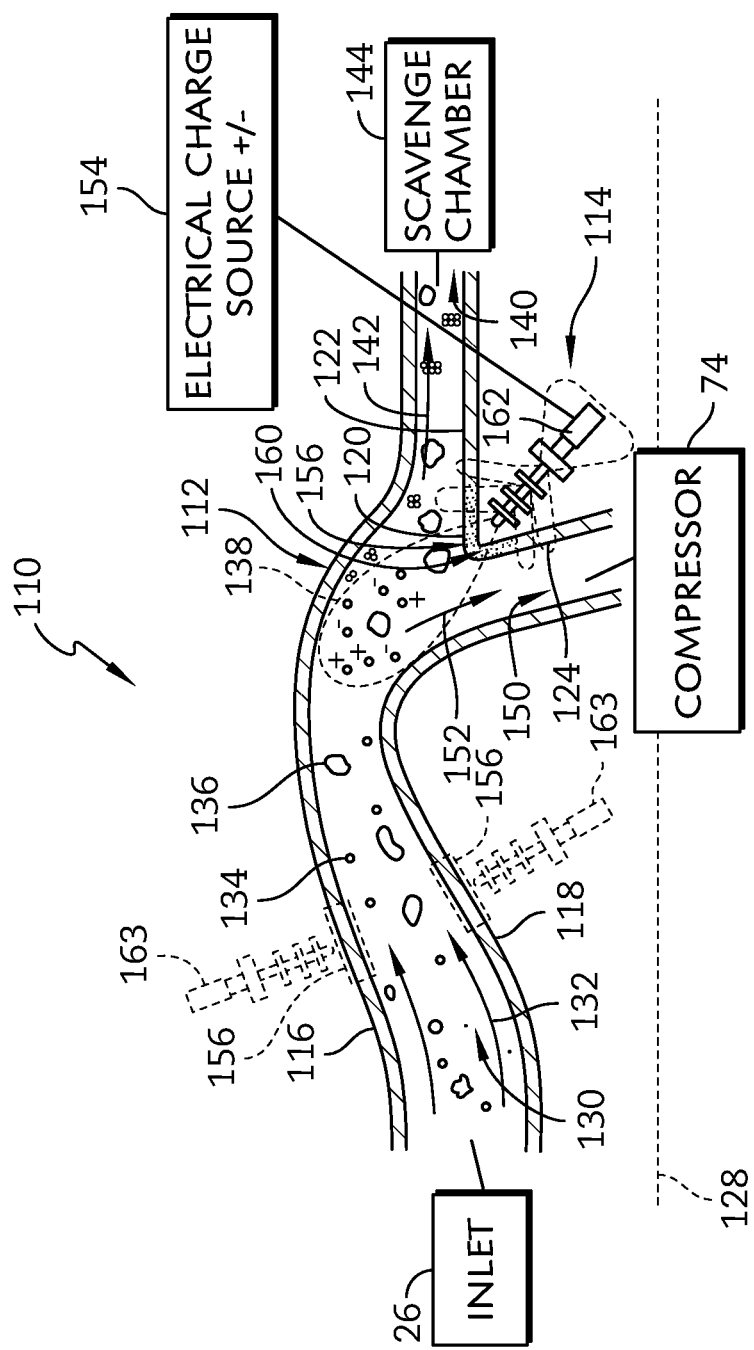
FIG. 3 is a view similar to FIG. 2 showing another embodiment of an air-inlet duct adapted for inclusion in the gas turbine engine of FIG. 1, the air-inlet duct comprises a particle separator including an electro-magnetically transparent window and an agglomerator including an antenna configured to emit an electro-magnetic field through the electro-magnetically transparent window to charge the particles entrained in the air in the air-inlet duct.

Another illustrative air-inlet duct 110 is shown in FIG. 3. The air-inlet duct 110 is configured for use in the gas turbine engine 70 and is substantially similar to the air-inlet duct 10 shown in FIGS. 1 and 2 and described herein. Accordingly, similar reference numbers in the 100 series indicate features that are common between the air-inlet duct 10 and the air-inlet duct 110. The description of the air-inlet duct 10 is hereby incorporated by reference to apply to the air-inlet duct 110, except in instances when it conflicts with the specific description and drawings of the air-inlet duct 110.

The air-inlet duct 110 includes a particle separator 112 and an agglomerator 114 as shown in FIG. 3. The particle separator 112 illustratively is an inertial particle separator and includes an outer wall 116, an inner wall 118, and a splitter 120. The inner wall 118 and the outer wall 116 cooperate to define an inlet passageway 130 therebetween. The splitter 120 includes an outer splitter surface 122 and an inner splitter surface 124 as shown in FIG. 3. The outer splitter surface 122 cooperates with the outer wall 116 to define a scavenge passageway 140 therebetween. The inner splitter surface 124 cooperates with the inner wall 118 to define a compressor passageway 150 therebetween. The outer splitter surface 122 is coupled to the inner splitter surface 124 at a splitter tip 160.

The splitter tip 160 includes an electro-magnetically transparent window 156 as shown in FIG. 3. In the illustrative embodiment, the electro-magnetically transparent window 156 fully extends circumferentially around the engine rotation axis 128. In the illustrative embodiment, the electro-magnetically transparent window 156 comprises ceramic. In some embodiments, the electro-magnetically transparent window 156 comprises fiberglass. In other embodiments, the electro-magnetically transparent window 156 comprises any suitable electro-magnetically transparent material.

In some embodiments, the outer wall 116 and the inner wall 118 include electro-magnetically transparent windows 156. In some embodiments, the electro-magnetically transparent windows 156 included in the outer wall 116 and the inner wall 118 are located in the region forming the inlet passageway 130. In some embodiments, the particle separator includes a plurality of electro-magnetically transparent windows 156 and each electro-magnetically transparent window 156 extends partially circumferentially around the engine rotation axis 128. In some embodiments, at least one of the inner wall 118, the outer wall 116, and the splitter 120 includes an electro-magnetically transparent window 156.

The agglomerator 114 is configured to emit an electromagnetic field 138 through the electro-magnetically transparent window 156 into the particle separator 112 as shown in FIG. 3. In the illustrative embodiment, the agglomerator 114 includes an antenna 162 configured to emit the electromagnetic field 138 as suggested in FIG. 3. The antenna may be one of a yagi antenna, a slotted waveguide antenna, a log spiral antenna, a dish shaped antenna, or any other suitable alternative. The agglomerator 114 includes an electrical charge source 154 configured to charge the antenna 162.

As shown in FIG. 3, the antenna 162 is located in the splitter tip 160 radially between the outer splitter surface 122 and the inner splitter surface 124. The antenna 162 emits the electro-magnetic field 138 through the electro-magnetically transparent window 156 into the inlet passageway 130. In the illustrative embodiment, the agglomerator 114 includes a plurality of antennae 162 spaced circumferentially around the engine rotation axis 128. In some embodiments, the agglomerator 114 includes a second set of antennae 163 aligned with electro-magnetically transparent windows 156 in the outer wall 116 and inner wall 118. In some embodiments, the second set of antennae 163 is spaced circumferentially around the engine rotation axis 128.

Figure 4:
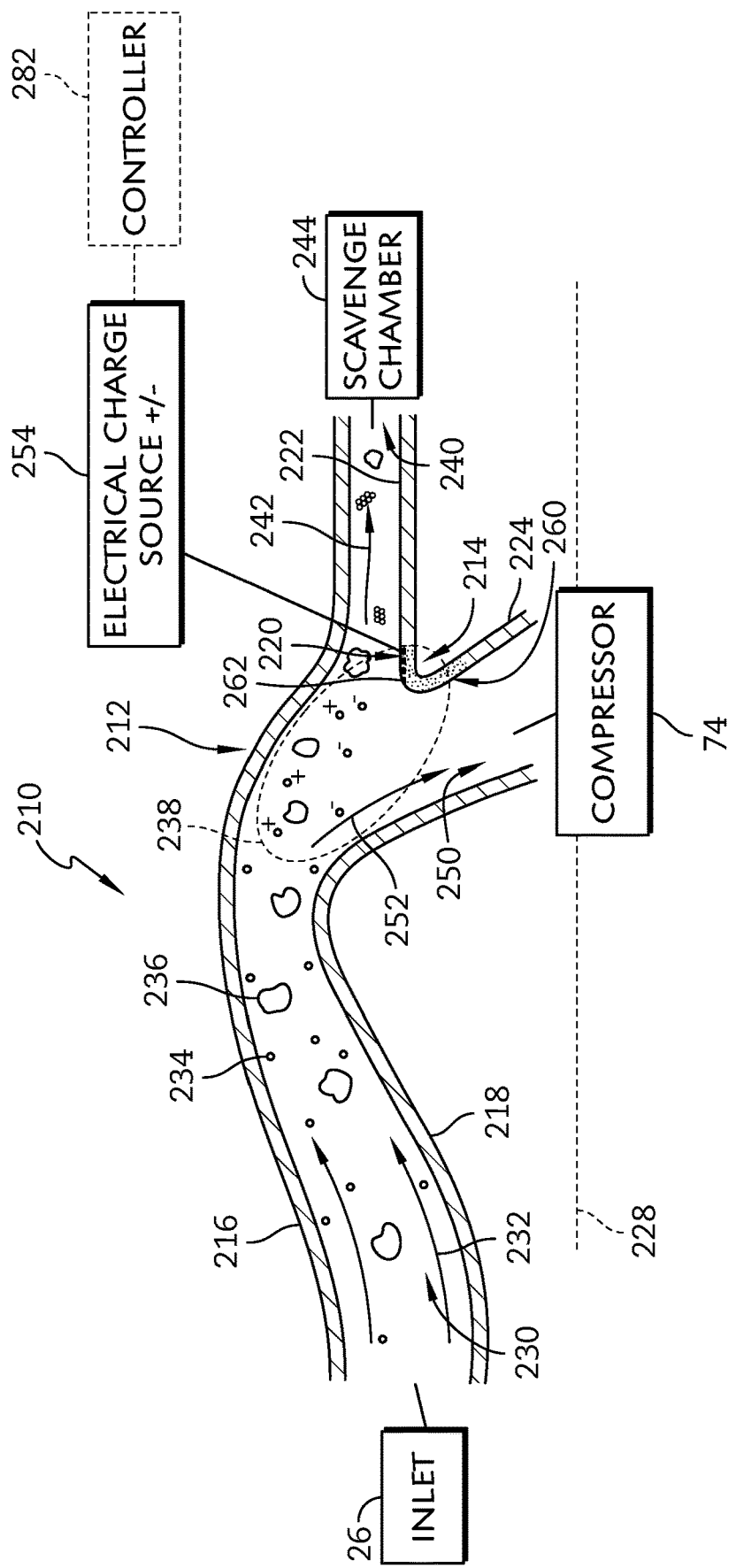
FIG. 4 is a view similar to FIG. 2 showing yet another embodiment of an air-inlet duct adapted for inclusion in the gas turbine engine of FIG. 1, the air-inlet duct comprises a particle separator and an agglomerator coupled to a splitter tip of the particle separator.

Another illustrative air-inlet duct 210 is shown in FIG. 4. The air-inlet duct 210 is configured for use in the gas turbine engine 70 and is substantially similar to the air-inlet duct 10 shown in FIG. 2 and described herein. Accordingly, similar reference numbers in the 200 series indicate features that are common between the air-inlet duct 10 and the air-inlet duct 210. The description of the air-inlet duct 10 is hereby incorporated by reference to apply to the air-inlet duct 210, except in instances when it conflicts with the specific description and drawings of the air-inlet duct 210.

The air-inlet duct 210 includes a particle separator 212 and an agglomerator 214 as shown in FIG. 4. The particle separator 212 illustratively is an inertial particle separator and includes an outer wall 216, an inner wall 218, and a splitter 220. The inner wall 218 and the outer wall 216 cooperate to define an inlet passageway 230 therebetween. The splitter 220 includes an outer splitter surface 222 and an inner splitter surface 224 as shown in FIG. 4. The outer splitter surface 222 cooperates with the outer wall 216 to define a scavenge passageway 240 therebetween. The inner splitter surface 224 cooperates with the inner wall 218 to define a compressor passageway 250 therebetween. The outer splitter surface 222 is coupled to the inner splitter surface 224 at a splitter tip 260.

The agglomerator 214 includes a spiral-shaped conductive element 262 and an electrical charge source 254 as shown in FIG. 4. The spiral-shaped conductive element 262 is coupled to the outer splitter surface 222. The spiral-shaped conductive element 262 extends around an engine rotation axis 228 to form a spiral shape. The spiral-shaped conductive element 262 is configured to be charged by the electrical charge source 254 to cause the spiral-shaped conductive element 262 to emit an electro-magnetic field 238 into the particle separator 212. The spiral-shaped conductive element 262 is formed around the engine rotation axis 228 to cause the electro-magnetic field 238 to form a desired shape and to direct the electro-magnetic field 238 into a desired location in the particle separator 212.

As shown in FIG. 4, the spiral-shaped conductive element 262 emits the electro-magnetic field 238 into the inlet passageway 230. In the illustrative embodiment, the spiral-shaped conductive element 262 is formed in the splitter 220 and coupled to an inner portion of the outer splitter surface 222. In other embodiments, the spiral-shaped conductive element 262 is coupled to an outer portion of the outer splitter surface 222 and extends into the scavenge passageway 240.

The spiral-shaped conductive element 262 may comprise copper, silver, iron, gold, aluminum, tungsten, titanium, and any other suitable material for emitting an electro-magnetic field 238. In the illustrative embodiment, the splitter tip 260 comprises ceramic. In some embodiments, the splitter tip 260 comprises fiberglass. In other embodiments, the splitter tip 260 comprises an insulating material.

Figure 5:
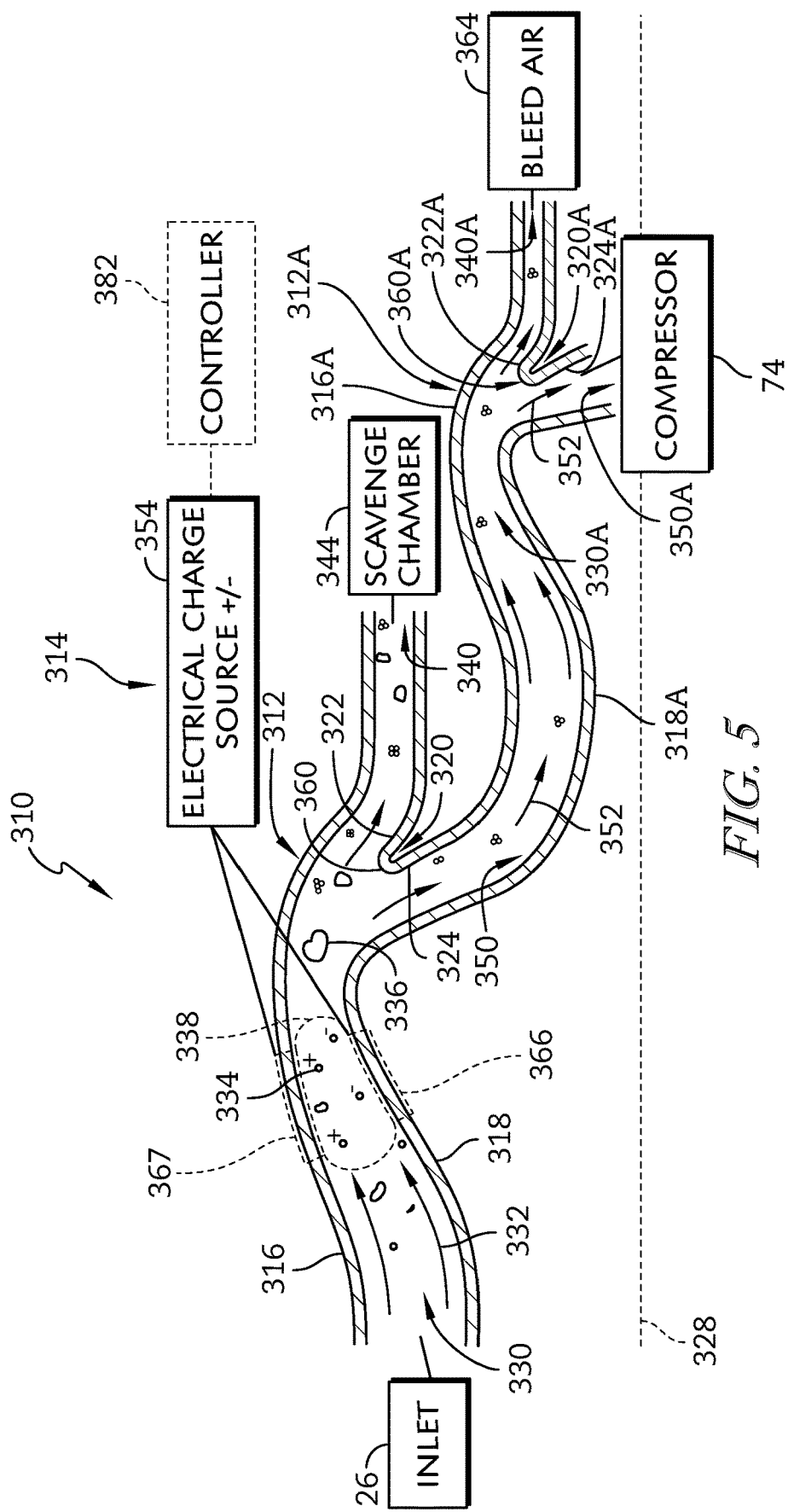
FIG. 5 is a view similar to FIG. 2 showing yet another embodiment of an air-inlet duct adapted for inclusion in the gas turbine engine of FIG. 1, the air-inlet duct comprises a first particle separator, an agglomerator, and a second particle separator downstream of the first particle separator.

Still yet another illustrative air-inlet duct 310 is shown in FIG. 5. The air-inlet duct 310 is configured for use in the gas turbine engine 70 and is substantially similar to the air-inlet duct 10 shown in FIG. 2 and described herein. Accordingly, similar reference numbers in the 300 series indicate features that are common between the air-inlet duct 10 and the air-inlet duct 310. The description of the air-inlet duct 10 is hereby incorporated by reference to apply to the air-inlet duct 310, except in instances when it conflicts with the specific description and drawings of the air-inlet duct 310.

The air-inlet duct 310 includes a first particle separator 312 and an agglomerator 314 as shown in FIG. 5. The first particle separator 312 illustratively is an inertial particle separator and includes an outer wall 316, an inner wall 318, and a splitter 320. The inner wall 318 and the outer wall 316 cooperate to define an inlet passageway 330 therebetween. The splitter 320 includes an outer splitter surface 322 and an inner splitter surface 324 as shown in FIG. 5. The outer splitter surface 322 cooperates with the outer wall 316 to define a scavenge passageway 340 therebetween. The inner splitter surface 324 cooperates with the inner wall 318 to define a compressor passageway 350 therebetween. The outer splitter surface 322 is coupled to the inner splitter surface 324 at a splitter tip 360.

In the illustrative embodiment, the agglomerator 314 includes an electrical charge source 354 as shown in FIG. 5. The electrical charge source 354 is configured to electrically charge the inner wall 318 and the outer wall 316 of the particle separator 312. Illustratively, the inner wall 318, the outer wall 316, and the splitter 320 include ferrous material. The charged inner wall 318 and outer wall 316 emit an electro-magnetic field 338 into the particle separator 312 to charge the fine particles 334. In other embodiments, the agglomerator 314 includes any other suitable structure for charging the fine particles 34 in the particle separator 312 so that the fine particles 34 cluster and form large particles 36.

The air-inlet duct 310 further includes a second particle separator 312A coupled to the first particle separator 312 as shown in FIG. 5. The second particle separator 312A is located between the compressor passageway 350 and the compressor 74. The second particle separator 312A is configured to direct large particles entering the second particle separator 312A radially outward into a scavenge passageway 340A.

The second particle separator 312A is illustratively an inertial particle separator and includes an outer wall 316A, an inner wall 318A, and a splitter 320A. The inner wall 318A and the outer wall 316A cooperate to define an inlet passageway 330A therebetween. The splitter 320A includes an outer splitter surface 322A and an inner splitter surface 324A as shown in FIG. 5. The outer splitter surface 322A cooperates with the outer wall 316A to define the scavenge passageway 340A therebetween. The inner splitter surface 324A cooperates with the inner wall 318A to define a compressor passageway 350A therebetween.

The inlet passageway 330A is in fluid communication with the compressor passageway 330 defined by the first particle separator 312. The compressor passageway 350A is in fluid communication with the compressor 74. The first particle separator 312 is configured to reduce the number of particles 334, 336 directed to the second particle separator 312A. The second particle separator 312A further reduces the number of particles 334, 336 directed to the compressor 74 of the gas turbine engine 70.

In the illustrative embodiment, the second particle separator 312A directs a flow of bleed air 364 from the scavenge passageway 340A to one or more secondary air-receiving systems (not shown). The secondary air-receiving systems may include an anti-icing system, a blade-tip clearance system, a cooling system, a thrust balance control system, a sump sealing system, and a turbine case cooling system. In other embodiments, the air in the second scavenge passageway 340A is directed into a scavenge chamber 344 with the air from the scavenge passageway 340.

The engine core 72 includes the compressor 74, the combustor 76, and the turbine 78. The compressor 74 is configured to compress air. The combustor 76 is configured to mix fuel with compressed air from the compressor 74 to form a fuel-air mixture and to ignite the fuel-air mixture. The turbine 78 is configured to extract work from combusted products of the fuel-air mixture. In some embodiments, the gas turbine engine 70 includes one or more compressors 74 and/or one or more turbines 78. While several embodiments of air-inlet ducts 10, 110, 210, 310 are discussed herein, any air-inlet ducts 10, 110, 210, 310 may be used together or separately in a gas turbine engine.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet duct for a gas turbine engine, the air-inlet duct comprising
   a particle separator formed to include an inlet passageway for receiving a stream of air, a compressor passageway that extends downstream from the inlet passageway, and a scavenge passageway that extends downstream from the inlet passageway and that is positioned radially outward of the compressor passageway, the particle separator configured to receive atmospheric air laden with fine particles and large particles and to direct the large particles into the scavenge passageway while allowing the atmospheric air to move into the compressor passageway thereby reducing the number of large particles that enter the compressor passageway, and an agglomerator configured to emit an electro-magnetic field into the inlet passageway to charge the fine particles in the inlet passageway to cause the fine particles to be attracted to one another and cluster together to form large particles directed into the scavenge passageway by the particle separator to reduce the number of fine particles directed into the compressor passageway, wherein the particle separator includes an outer wall spaced apart from an engine rotation axis, an inner wall located between the outer wall and the engine rotation axis, the inner wall and the outer wall defining the inlet passageway therebetween, and a splitter located between the outer wall and the inner wall and including an outer splitter surface that cooperates with the outer wall to define the scavenge passageway therebetween and an inner splitter surface cooperating with the inner wall to define the compressor passageway therebetween, wherein the inner wall, the outer wall, and the splitter include electromagnetically conductive material and the agglomerator includes an electrical charge source configured to electrically charge at least one of the inner wall, the outer wall, and the splitter to emit the electro-magnetic field into the inlet passageway.

2. The air-inlet duct of claim 1, wherein the electrical charge source is configured to charge at least one of the inner wall, the outer wall, and the splitter with an alternating current.

3. A gas turbine engine comprising
an engine core including a compressor configured to compress air, a combustor configured to mix fuel with compressed air from the compressor to form a fuel-air mixture and to ignite the fuel-air mixture, and a turbine configured to extract work from combusted products of the fuel-air mixture, and an air-inlet duct including a particle separator and an agglomerator, the particle separator formed to include an inlet passageway for receiving a stream of air, a compressor passageway that extends downstream from the inlet passageway, and a scavenge passageway that extends downstream from the inlet passageway and that is positioned radially outward of the compressor passageway, wherein the particle separator is configured to receive atmospheric air laden with fine particles and large particles and to direct the large particles into the scavenge passageway while allowing the atmospheric air to move into the compressor passageway thereby reducing the number of large particles that enter the compressor, and wherein the agglomerator is configured to emit an electro-magnetic field into the inlet passageway to charge the fine particles in the inlet passageway to cause the fine particles to be attracted to one another and cluster together to form large particles directed into the scavenge passageway by the particle separator to reduce the number of fine particles directed into the compressor, wherein the particle separator includes an outer wall spaced apart from an engine rotation axis and an inner wall located between the outer wall and the engine rotation axis, the inner wall and the outer wall defining the inlet passageway therebetween, the inner wall and the outer wall include electromagnetically conductive material, and the agglomerator includes an electrical charge source configured to electrically charge the inner wall and the outer wall to cause the inner wall and the outer wall to emit electro-magnetic fields into the inlet passageway.

4. The gas turbine engine of claim 3, wherein the particle separator includes a splitter located between the outer wall and the inner wall and including an outer splitter surface that cooperates with the outer wall to define the scavenge passageway therebetween and an inner splitter surface cooperating with the inner wall to define the compressor passageway therebetween.

5. The gas turbine engine of claim 3, further comprising a second particle separator located between the compressor passageway and the compressor, the second particle separator is configured to direct any large particles in the second particle separator radially outward into a second scavenge passageway to reduce the number of large particles directed into the compressor.

6. A method of separating particles suspended in an air-inlet duct included in a gas turbine engine, the method comprising
charging fine particles suspended in an inlet passageway of the air-inlet duct to cause the fine particles to be attracted to one another and to cluster together to form large particles, collecting the large particles into a first portion of the air-inlet duct, separating air in the air-inlet duct into a first stream of air having an increased number of large particles suspended in the first stream of air and a second stream of air with a reduced number of large particles suspended in the second stream of air, and directing the first stream of air into a scavenge chamber included in the gas turbine engine and the second stream of air into a compressor included in the gas turbine engine, wherein the air-inlet duct includes an outer wall spaced apart from an engine rotation axis, an inner wall located between the outer wall and the engine rotation axis, and a splitter located between the outer wall and the inner wall, the inner wall and the outer wall defining the inlet passageway therebetween, and the splitter including an outer splitter surface that cooperates with the outer wall to define the scavenge passageway therebetween and an inner splitter surface cooperating with the inner wall to define the compressor passageway therebetween, wherein the inner wall, the outer wall, and the splitter include electromagnetically conductive material and wherein charging the fine particles in the inlet passageway includes electrically charging the electromagnetically conductive material included in at least one of the inner wall, the outer wall, and the splitter with an electrical charge source to emit an electro-magnetic field into the inlet passageway.

7. An air-inlet duct comprising
a particle separator including an outer wall radially spaced apart from an engine rotation axis, an inner wall radially located between the outer wall and the engine rotation axis, and a splitter radially located between the outer wall and the inner wall, the inner wall and the outer wall define an inlet passageway therebetween for receiving atmospheric air laden with fine particles and large particles, the splitter includes an outer splitter surface that cooperates with the outer wall to define a scavenge passageway therebetween and an inner splitter surface cooperating with the inner wall to define a compressor passageway therebetween, the scavenge passageway extends downstream from the inlet passageway and is positioned radially outward of the compressor passageway so that the large particles are directed into the scavenge passageway while the atmospheric air is directed into the compressor passageway thereby reducing the number of large particles that enter the compressor passageway, and an agglomerator including an electrical charge source configured to charge at least one of the inner wall, the outer wall, and the splitter to cause the at least one of the inner wall, outer wall, and splitter to emit an electro-magnetic field into the inlet passageway to charge the fine particles in the inlet passageway to cause the fine particles to be attracted to one another and cluster together to form large particles directed into the scavenge passageway by the particle separator and a controller configured to adjust a magnitude of electric power supplied to the at least one of the inner wall, outer wall, and splitter from the electrical charge source to cause the at least one of the inner wall, outer wall, and splitter to generate heat and block ice accumulation in the air-inlet duct.

8. The air-inlet duct of claim 7, wherein the controller is configured to adjust a voltage of the electric power supplied to the at least one of the inner wall, outer wall, and splitter from the electrical charge source.

9. The air-inlet duct of claim 7, further comprising a sensor configured to detect ice accumulation or potential ice accumulation in the air-inlet duct and the controller is configured to adjust the magnitude of the electric power supplied to the at least one of the inner wall, outer wall, and splitter to melt the ice in response to receipt of signals from the sensor indicative of ice formation or potential ice formation.

10. The air-inlet duct of claim 7, further comprising a user input coupled to the controller and configured to receive inputs associated with icy conditions and the controller is configured to adjust the magnitude of the electric power supplied to the at least one of the inner wall, outer wall, and splitter to melt the ice in response to receipt of signals from the user input.

11. The air-inlet duct of claim 7, wherein the at least one of the inner wall, outer wall, and splitter includes an electromagnetically transparent composite material that includes an electromagnetically conductive element configured to be charged by the electrical charge source.

12. The air-inlet duct of claim 11, wherein the electromagnetically conductive element includes one or more of a conductive wire grid, conductive fibers, and conductive particles for radiating an electro-magnetic field.

* * * * *